US009255820B2

United States Patent
Hopp (10) Patent No.: US 9,255,820 B2
(45) Date of Patent: Feb. 9, 2016

(54) SENSOR FOR MEASURING THE ANGLE OF ROTATION HAVING AT LEAST DUAL ROTATABLE CODE DISC WITH AT LEAST DUAL OPTICS

(71) Applicant: SICK Stegmann GmbH, Donaueschingen (DE)

(72) Inventor: David Hopp, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 108 days.

(21) Appl. No.: 14/258,673

(22) Filed: Apr. 22, 2014

(65) Prior Publication Data

US 2014/0353478 A1  Dec. 4, 2014

(30) Foreign Application Priority Data

May 28, 2013  (EP) ..................... 13169411

(51) Int. Cl.
*G01D 5/347* (2006.01)
*G06F 3/03* (2006.01)

(52) U.S. Cl.
CPC .......... *G01D 5/3473* (2013.01); *G01D 5/34707* (2013.01); *G06F 3/0317* (2013.01)

(58) Field of Classification Search
CPC ............ G01D 5/3473; G01D 5/34707; G01D 5/24457; G11B 2007/13727; G01B 7/30; G01B 11/26

USPC ............... 250/231.13, 231.16, 231.18, 208.1, 250/239; 341/11, 13, 31; 356/136–139, 356/141.1–141.3, 614–617

See application file for complete search history.

(56) References Cited

U.S. PATENT DOCUMENTS

| 4,518,859 | A * | 5/1985 | Hoshika | ................. G01B 3/006 250/231.14 |
|---|---|---|---|---|
| 7,697,127 | B2 | 4/2010 | Vogel et al. | |
| 2009/0152452 | A1 | 6/2009 | Lee et al. | |
| 2010/0006748 | A1 | 1/2010 | Mizuno et al. | |

FOREIGN PATENT DOCUMENTS

| DE | 10238640 B4 | 3/2004 |
|---|---|---|
| DE | 102010000732 A1 | 7/2010 |
| EP | 1890113 A1 | 2/2008 |

OTHER PUBLICATIONS

Search Report dated Oct. 22, 2013, for Corresponding EP Application No. 13169411.9.

* cited by examiner

*Primary Examiner* — Que T Le
(74) *Attorney, Agent, or Firm* — Nath, Goldberg & Meyer; Jerald L. Meyer; Rury L. Grisham (57) ABSTRACT

The invention relates to an angle of rotation sensor comprising a rotatable first code disc, at least one first image sensor and at least one optics which images an optical code of the code disc onto the first image sensor.

9 Claims, 11 Drawing Sheets

SENSOR FOR MEASURING THE ANGLE OF ROTATION HAVING AT LEAST DUAL ROTATABLE CODE DISC WITH AT LEAST DUAL OPTICS

BACKGROUND

Technical Field

The invention relates to an angle of rotation sensor comprising a rotatable first code disc, at least one first image sensor and at least one optics which images an optical code of the code disc onto the first image sensor.

Such angle of rotation sensors or angle sensors are, for example known from the U.S. Pat. No. 7,697,127 B2. In this connection a rotatably arranged pattern element is illuminated by a light source. The light from the light source is incident on an imaging unit following remission at the pattern element. Furthermore, an angle determination unit is provided in order to determine an angle of rotation of the pattern member with reference to a reference position at the imaging unit, on the basis of a phase shift between a phase of a waveform, which results from the projected image, and a reference phase value, which corresponds to the reference position, with the waveform being illustrated by means of measurement values of the photosensitive pixels.

Furthermore, multi-turn angle measurement devices are known, for example, from DE 102 38 640 B4. This discloses a multi-turn angle measurement device having a first dimensional scale which is rotationally fixedly connected to an input shaft and which is scanned by means of a first scanning unit for the determination of the angular position of the input shaft and having further dimensional scales which have axes of rotation arranged in parallel to one another in order to measure the number of rotations of the input shaft, wherein each dimensional scale is reduced in gear by means of a gear reduction transmission with respect to the respective preceding dimensional scale and a respective scanning unit is arranged at a circuit board for the scanning of each dimensional scale, with an input gear connected to the input shaft being provided.

The requirements of modern angle of rotation sensors are constantly increasing. Angle of rotation sensors should be manufacturable more cost-effectively. Furthermore, angle of rotation sensors should be more robust with respect to thermal and mechanical conditions. In particular on installation in a motor as a so-called motor feedback encoder high axial and radial mechanical tolerances as well as tilts of the motor shaft have to be considered. In addition to this, it has to be considered that the motor shaft becomes very hot, for example up to 150°, so that an angle of rotation measurement unit close to the motor shaft must also be correspondingly designed with respect to the materials.

SUMMARY

The object of the present invention consists therein of providing a cost-effective angle of rotation sensor which allows the specification of absolute statements of position.

The present object is satisfied by an angle of rotation sensor having a rotatable first code disc, at least one first image sensor and at least one optics, which images an optical code of the code disc onto the first image sensor, wherein at least one second rotating code disc is provided which is either directly or indirectly rotatably connected to the first code disc with a transmission ratio, wherein an optical code of the second code disc is imaged onto the first image sensor by means of a second optics.

The angle of rotation sensor in accordance with the invention forms a multi-turn sensor which is composed of at least two cascaded absolute angle sensors which in total enable the detection of the number of rotations, for example of a motor. The individual code discs are, for example, arranged at discrete stages of a mechanical transmission.

The present invention has the advantage that the recording of information by means of the image sensor is very robust. For example, a lateral displacement, a tilt or a change of spacing and/or a change of the imaging scale between the code disc and the image sensor does not or only very marginally affects the absolute angle of rotation measurements, since the recorded and evaluated information is identical independent thereof.

Furthermore, the present invention has the advantage that this is robust with respect to a change of the ambient light intensity and/or is robust with respect to an ambient light intensity distribution. Depending on the sensitivity of the image sensor an evaluation can also still be carried out for very little light which is remitted from the code disc.

Furthermore, the angle of rotation sensor in accordance with the invention is robust with respect to an ambient light wavelength. Different wavelengths of the ambient light, for example by interference light, only marginally influence the evaluation, as long as the contrast of the code disc can still be evaluated by the image sensor.

In accordance with this embodiment the angle of rotation sensor in accordance with the invention has the advantage that only a single image sensor is provided, whereby a simple evaluation with only one single evaluation unit is required, since all necessary information is included in the image information of the single image sensor.

The positioning of the code discs can be freely selected in dependence on the imaging. It must merely be ensured that sufficient information is provided through the image sensor in order to completely evaluate the position of the code discs.

Through the selection and the design of the optics and/or of the imaging optics, the size of the detector surface of the image sensor and the size and the position of the code discs, the angle of rotation encoder can be nearly arbitrarily scaled, whereby the angle of rotation sensor can be designed for the most diverse requirements.

The angular resolution of the angle of rotation sensor can be set via the selection of the number, the size and the arrangement of pixels at the image sensor.

The image sensor is at least composed of a photo-sensitive surface which is segmented into discrete individual detectors. Preferably it is an array. The image sensor is, for example, composed of a CCD array or a CMOS array. The optics is arranged upstream of the image sensor in order to image the code of the code disc in an as exact as possible manner onto the image sensor, this means focused onto the image sensor. Furthermore, an aperture is optionally arranged in front of the image sensor. If the aperture is selected small, then an increased depth of field is achieved, whereby an unresponsiveness with respect to a change of spacing between the code disc and the camera is achieved.

The angle information is preferably applied at the code disc in binary. This can, for example, take place in the form of black and white area segments and/or transparent and non-transparent area segments.

The image of the code disc at the image sensor is subjected to a scale, namely in dependence of the imaging scale, as well as a possible distortion or tilt. This means that the coding and/or the angular coding must be designed such that, albeit all these factors of influence, a sufficient angular evaluation is still possible. A preferred code disc for this purpose has an angular coding in the form of an optical edge, this means that the surface of the code disc is divided equally into a black half and into a white half. This division can extend centrally through the center of rotation of the code disc, or also extend off-center. In this connection an outer boundary of the code disc is arbitrary. Merely the rotating edge is imaged at the image sensor, this means that the part of the code disc having the bright dark transition is imaged, and/or a section of the code disc which includes this edge and/or this bright to dark transition is imaged.

The edge and/or the edges at the code disc do not have to be straight. For example it is plausible that a kinked edge is provided or also differently formed edges are provided for example, bent or wavy edges. For example, two or more edges can be implemented at the code disc.

The imaging preferably takes place focused, this means exact. However, the function is also provided for a defocused imaging when a binarization of the information at the code disc or a different arbitrary suitable filtering of the image takes place.

An angular evaluation takes place by means of an evaluation unit using an edge detection, for example a Sobel filter, a Canny filter or a similarly effective filter or merely by means of a direction dependent differentiation. This is ideally provided in both lateral directions of space x and y of the image sensor. The angle of rotation of the edge and in this way the angular position of the code disc is carried out via a determination of the edge inclination. Since this information alone does not provide an unambiguous angle signal the absolute angular position of the edge is additionally determined. This can, for example, take place via a further differentiation of the edge or also via the determination of the brightness values and/or their difference at the two sides of the edge.

In this way the evaluation unit provides an unambiguous and absolute angle signal in dependence on the rotation of the code disc. Since this merely takes place by means of the angular position of an edge the system is robust with respect to all mechanical tolerances. The single condition for the correction function is the imaging of a part of the edge onto the detector surface.

The angular position of the angle of rotation sensor is directly and exclusively dependent on the lateral pixel resolution, this means the number of pixels, the pixel size and the pixel arrangement of the image sensor, as well as the length of the imaged edge relative thereto.

For example, additional information could be applied at the code disc in order to determine the distance of the code disc or in order to determine the imaging scale. For example, ring-shaped or rectangular markings could be arranged at the code disc.

The code disc can, for example, resolve 16 angular states for a coding of 4 bit. Having regard to a cascade of two code discs one can thereby differentiate between 256 states of the code discs.

The code discs can for example have fields with different grey scales for coding the angle information. Provision is further also made in order to provide different colors at a code disc for coding the angle information. In this connection the edges can be designed exact or diffuse, this means that the transition between two different bright and/or different colored regions can be designed abrupt or flowing continuously. Depending on the code disc the image sensor can be configured to record binary images, grey scale images or colored images, for example RGB images.

Furthermore, different colors can also be provided at different code discs in order to better differentiate between the code discs.

The angle of rotation sensor in accordance with the invention can be of different design. Either the complete sensor is designed having regard to the high temperatures and tolerances or a so-called kit solution is selected which provides a mechanical and spatial separation of the position-fixed image sensor unit and the rotatable code disc.

A storage of the sensor components is no longer required for a kit solution, since the motor shaft is already mounted by means of ball-bearings. Merely the electronically passive code disc is subjected to the high temperature loads. In contrast to this, the electronic components are arranged spatially and thermally separate from the motor shaft in such a way that the temperature of the motor shaft hardly has any influence on the image sensor and the downstream evaluation unit.

In an embodiment of the invention further code discs are provided which are each respectively rotatably connected to a preceding code disc with a transmission ratio.

Thereby the formed angle of rotation sensor is in a position to count a larger number of rotations. For example, if three code discs are provided, with each having a coding of 4 bit/16 states, then 4096 states can be differentiated by means of this cascade. However, also provision can also be made for different angular resolutions.

In an embodiment of the invention a light source is arranged fixed in position, with the light source illuminating the code discs. Almost any arbitrary light source can hereby be used.

The code discs are illuminated by the light source in a transmission manner or in a reflective manner so that the light bears the angle information encoded at the code disc following transmission and/or reflection from the code disc. Since the code disc ideally scatters the light, the light source can be arbitrarily positioned. Also an indirect illumination is sufficient, as long as the code disc is completely illuminated and light is scattered in the direction of the image sensor.

In accordance with a further embodiment the optics are formed by a single optics, by means of which the common optics is provided for all code discs.

Thereby the angle of rotation sensor becomes more cost-effective, since only one common optics has to be provided. Thereby, the angle of rotation sensor can also be manufactured more compact. The optics can, for example be an objective comprising a plurality of lenses.

In accordance with an embodiment of the invention a separate image sensor is provided for each code disc. Thereby the image frequency and/or the scanning frequency of each imaging sensor can be individually matched to the respectively associated code disc. Furthermore, the image sensors can be adapted to the spatial conditions of the code disc.

The image sensors can be evaluated by a common evaluation unit. However, it is also possible to provide a multi-component evaluation unit which, for example, in a first stage carries out a pre-evaluation of the image sensors and in a second stage links the information from the pre-evaluation.

In an embodiment of the invention the optics is designed as refractive, diffractive or reflexive. A refractive optics is simple to manufacture and cost-effective. For example, the refractive optics can be produced from plastic in an injection molded process. However, the refractive optics can also be produced from glass. Glass has the advantage that the optics can also be used for extreme temperatures, for example of up to 150° C.

Diffractive optics can be very small and can thus be designed in a space-saving manner. Thereby, the angle of rotation sensor can be of very compact design. A reflexive optics can, for example, be used then when a beam deflection is desired in order to realize an advantageous geometric arrangement in which the optics and the image sensor not only lie at a straight optical axis. A reflexive optics can also be sensibly used without deflecting the optical axis, for example, for telescopic objectives.

In an embodiment of the invention the light source transmits coherent, incoherent or partly coherent light. For example, coherent light can be produced by a laser. Thereby the light of the light source can unambiguously be associated with the light source and can be differentiated from ambient light. The angle of rotation sensor is thereby less sensitive to interferences by ambient light. For example, the light can be pulsed in time in order to ensure a suppression of ambient light.

In an embodiment, the light source is of narrowband design or of broadband design with respect to the transmitted wavelength. In the case of a narrowband light source ambient light can in turn also be suppressed well, since the narrowband wavelength of the light source is known. A broadband light source has the advantage that a cheaper light source can be used.

In an embodiment of the invention a beam forming optics is arranged downstream of the light source which is configured as refractive, diffractive or reflexive. The direction of the light beams of the light source can be oriented through the beam forming optics so that an efficient and effective illumination of the code disc is achieved. A refractive optics can be produced simply and cost-effectively, wherein a precise illumination could be achieved. A diffractive optics can be produced very compact so that the angle of rotation sensor can be of very compact design. A reflexive beam-forming optics allows a beam deflection, whereby the light source can be positioned differently.

The angle of rotation sensor in accordance with the invention can be used for the angle of rotation measurement of motors.

The angle of rotation sensor in accordance with the invention can also be combined with different optical measurement principles, for example, the polarization encoder principle. Furthermore, the angle of rotation sensor in accordance with the invention can be combined with non-optical measurement principles, such as magnetic measurement principles. Having regard to a combination of code discs in accordance with the present invention using different optical measurement principles or a combination using non-optical measurement principles also a redundant and/or a diverse evaluation of the rotational movement can be achieved, since the measurement principles are different. Thereby, a secure angle of rotation sensor can be formed in accordance with the invention which can be used in safety critical applications in accordance with machine safety.

BRIEF DESCRIPTION OF THE DRAWINGS

The invention will be described in the following also with respect to further advantages and features with reference to the submitted drawing by means of embodiments. The Figures of the drawing show in.

DETAILED DESCRIPTION

In the following Figures identical parts are provided with identical reference numerals.

Figure 1:
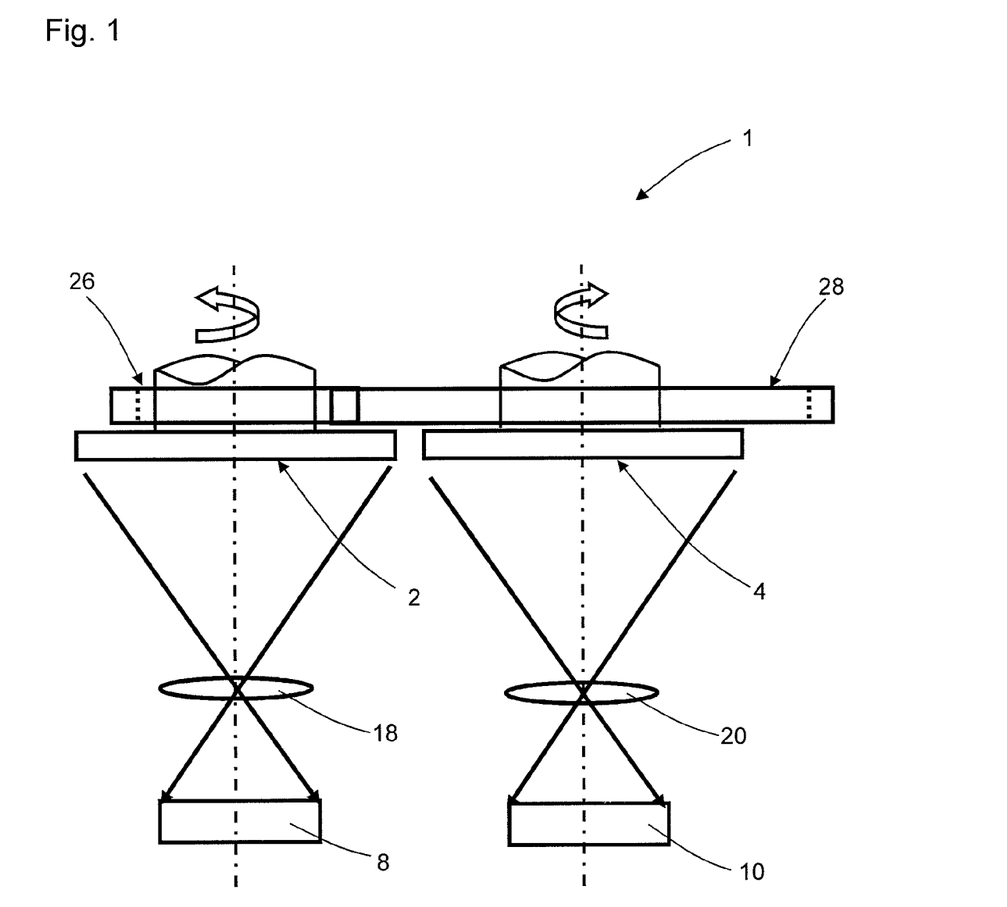
FIG. 1 an angle of rotation sensor in accordance with the invention.

FIG. 1 shows an angle of rotation sensor 1 having a rotatable first code disc 2, at least one first image sensor 8 and at least one optics 18, which images an optical code 14 of the code disc 2 onto the first image sensor 8, wherein at least two rotatable code discs 4 are provided which are either directly or indirectly rotatably connected to the first code disc 2 with a transmission ratio, for example, composed of a first toothed gear 26 and a second toothed gear 28, wherein an optical code of the second code disc 4 is imaged onto the second image sensor 10 by means of a second optics 20.

The image sensor 8 is at least composed of a photo-sensitive surface which is segmented into discrete individual detectors. Preferably it is a CCD array or a CMOS array. If a small aperture is selected for the image sensor 8 a high depth of field can be ensured which leads to an unresponsiveness with respect to changes in spacing between the code disc and the camera.

Figure 2:
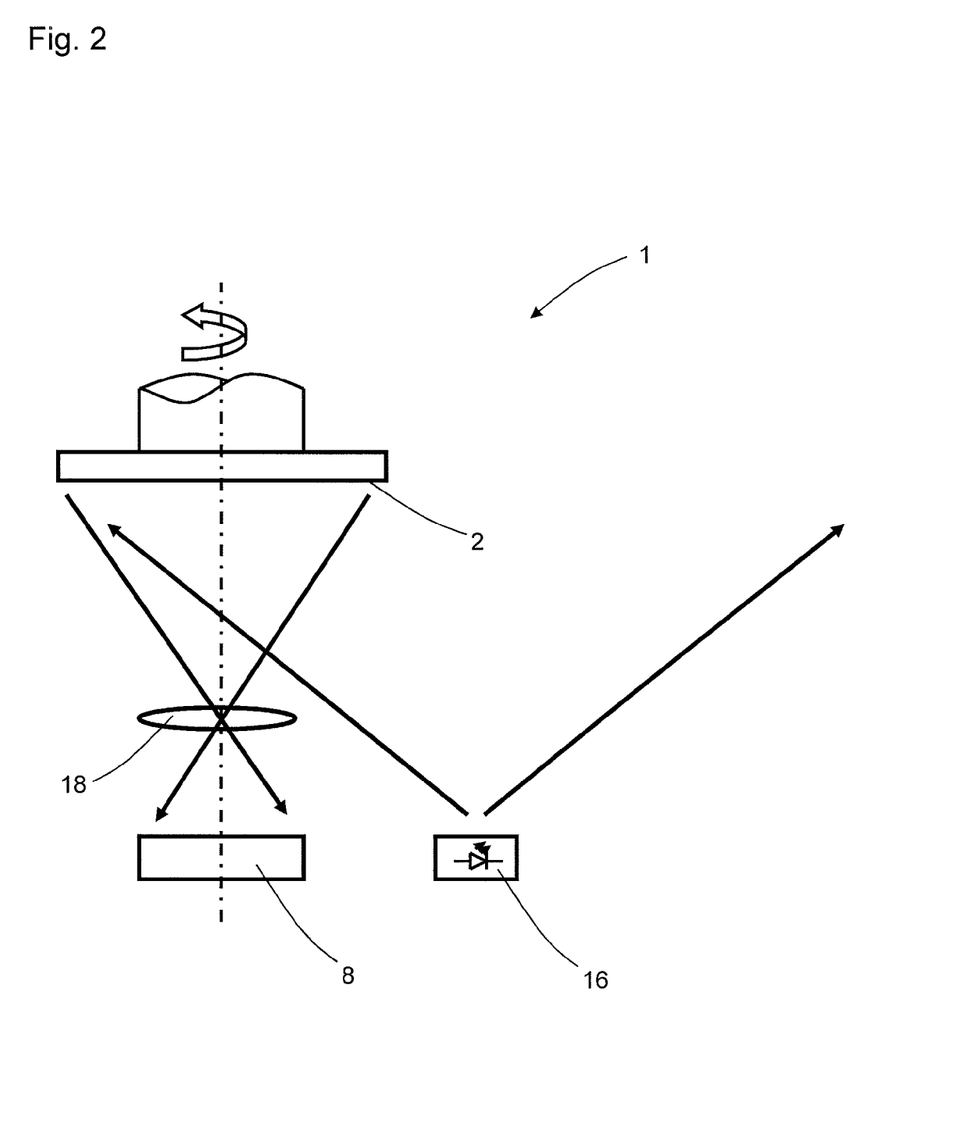
FIG. 2 an angle of rotation sensor with illumination.

FIG. 2 shows a light source 16 for illuminating the code discs, wherein only one code disc 2 having an optics 18 is illustrated in this Figure. The light source 16 can transmit coherent, incoherent or partly incoherent light. Furthermore, the light source 16 can be of narrowband or of broadband design with respect to the transmitted wavelength. A possibly present beam forming optics arranged downstream of the light source 16 in order to bunch and to direct the light onto the code disc is not illustrated. The beam forming optics can be configured as refractive, diffractive or reflexive. The light source 16 is positioned beside the image sensor 8 in accordance with FIG. 2. The code disc 2 is illuminated by the light source 16 in a transmissive or reflexive manner so that the light following the transmission and/or the reflexion from the code disc 2 bears the angle information encoded there. Since the code disc 2 ideally scatters the light, the light source 16 can be arbitrarily positioned. Also an indirect illumination is sufficient, as long as the code disc 2 is completely illuminated and the light is scattered in the direction of the image sensor 8 or of the camera. The light source 16 can be used in a continuous mode of operation or in a pulsed manner. Also a plurality of light sources 16 with different properties such as for example different wavelengths, band widths, brightness or imaging characteristics can be used.

Figure 3:
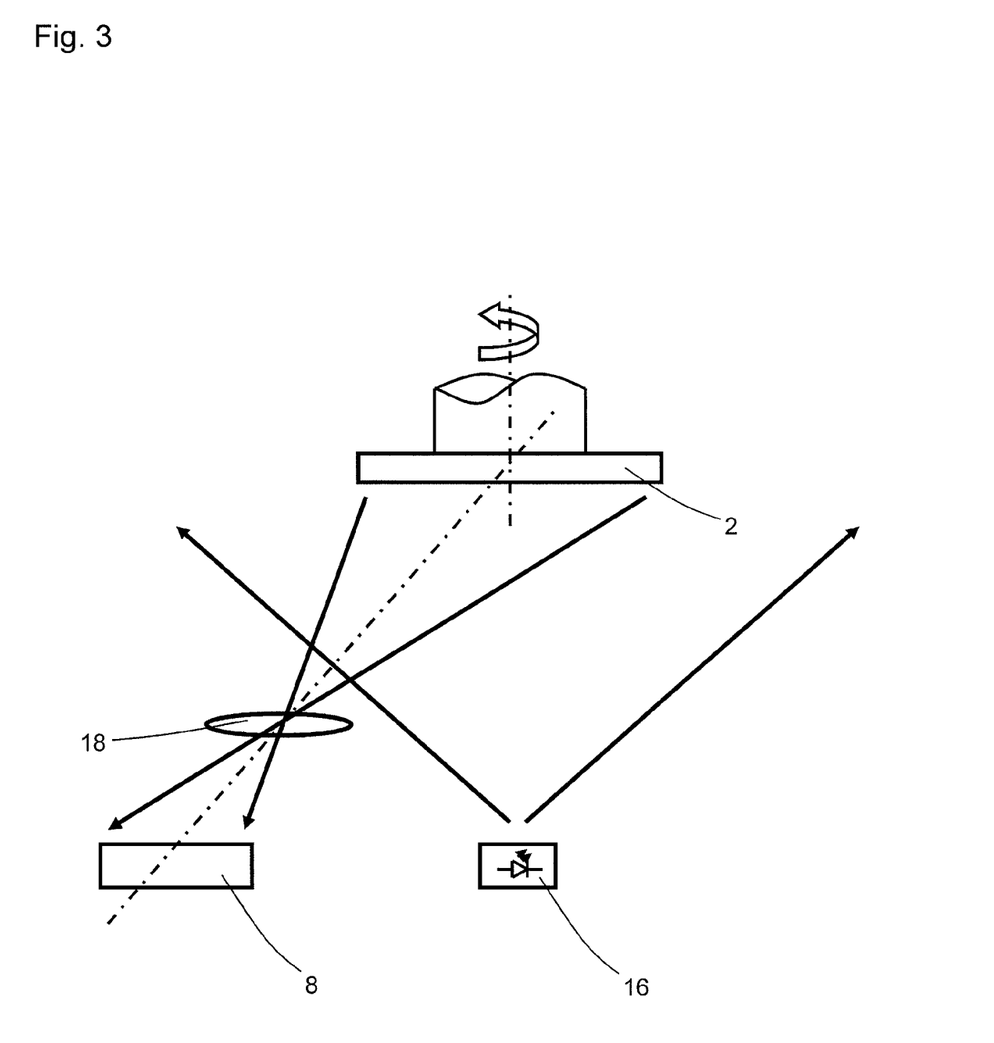
FIG. 3 an angle of rotation sensor with tilted optical axis and illumination.

In accordance with the illustration shown in FIG. 3 the optical axis between the image sensor 8 and the code disc 2 is tilted. This means that the optical axis of the image sensor 8 and the axis of rotation of the code disc are displaced in parallel with respect to one another or are also tilted with respect to one another. The optical axis between the image sensor 8 and the code disc 2 is tilted with respect to the axis of rotation of the code disc 2. For this reason the image sensor 8 advantageously does not have to be directly frontally arranged in front of the code disc 2. Thereby a favorable geometric construction can be selected. For example, a plurality of code discs can be seen by the image sensor 8. Furthermore, for example, a light source 16 can be arranged at an axis of rotation of the code disc 2, so that the light source 16 frontally illuminates the code disc 2. An optics 18 is provided in front of the image sensor 8.

The image of the code disc 2 at the image sensor 8 is subjected to a scaling in dependence on the imaging scale, as well as a possible distortion or a tilting. This means that the angular coding at the code disc 2 must be designed in such a way that, albeit all of these factors of influence, a sufficient angular evaluation is still possible.

Figure 4:
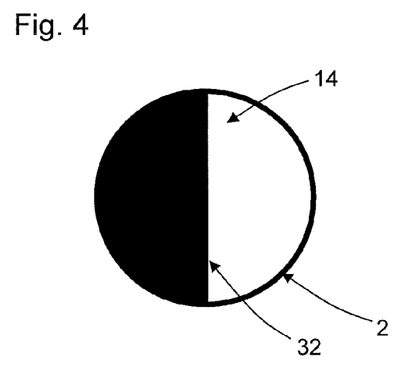
FIG. 4 a circular code disc having an edge along a diameter.

FIG. 4 shows a circular code disc 2 having an edge 32 along a diameter of the code disc 2. The edge 32 is generated by a black and/or a dark field and a directly adjacent white and/or bright field whereby an optical code 14 is formed. This is the case for an ideal code disc for the angle of rotation sensor, since the edge 32 divides the code disc into exactly two halves and thus a symmetric edge is present at the code disc 2. The angle information is thereby deposited at the code disc 2 in binary. Besides bright and dark fields also transparent and non-transparent area segments can be arranged at the code disc which are then detected in front of a different background by the image sensor. Furthermore, also grey scales or different colors are plausible for the generation of the edge 32. Furthermore, the edge 32 can also be designed exact or also diffuse, this means that the transition between two different bright and/or different color regions can be designed as either abrupt or continuous. The imaging of the edge 32 preferably takes place in a focused manner, this means exact, at the image sensor. The function is, however, also provided for a defocused imaging when a binarization or any arbitrary different suitable filtering of the image takes place.

Also additional information for determining the spacing of the code discs and/or the imaging scale can be implemented at the code disc 2, such as for example rings, rectangular marker or different scales.

The image sensor is selected to record binary images, grey scale images or color images, for example RGB images.

Figure 5:
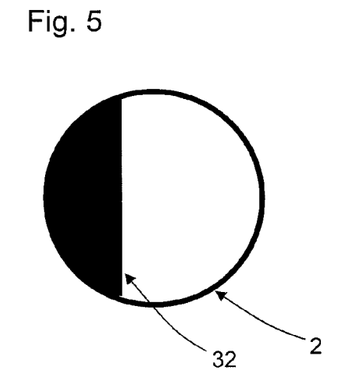
FIG. 5 a circular code disc have an eccentric edge.

FIG. 5 shows a code disc 2 for the angle of rotation sensor having an eccentric edge 32 which does not lie at the diameter of the code disc 2. Also such a code disc 2 can be used in the angle of rotation sensor in accordance with the invention. The edge 32 is in turn formed by a bright and a dark field.

Figure 6:
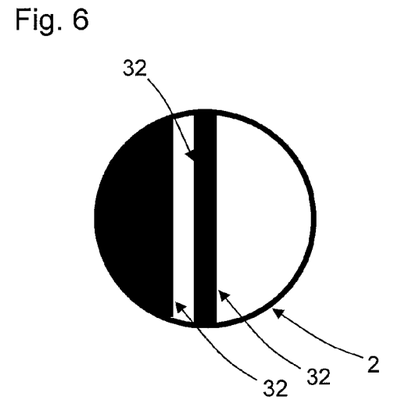
FIG. 6 a circular code disc with three edges.

FIG. 6 shows a code disc 2 having a plurality of edges 32, in particular with three edges 32 which are created by a plurality of bright and dark fields which are arranged in an alternating manner. The provision of a plurality of edges 32 at the code disc 2 enables a more unambiguous association and recognition of the code disc 2 through the image sensor and the evaluation unit connected downstream. The edge 32 and/ or the edges 32 can also have one or more kinks or changes in direction or can also be formed differently, for example curved.

Figure 7:
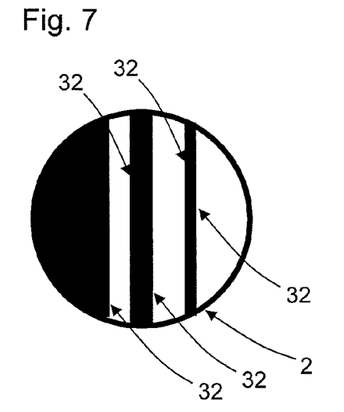
FIG. 7 a circular code disc with five edges.

FIG. 7 likewise shows a code disc 2 having a plurality of edges, in particular having five edges 32 which are formed by a plurality of bright and dark fields and/or strips.

Figure 8:
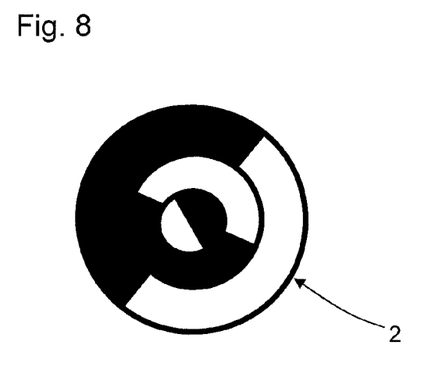
FIG. 8 a circular code disc with circular arc-shaped codes at different diameters or three code discs arranged behind one another.

FIG. 8 shows a code disc 2 having three "stacked" code discs of different diameter. The code disc 2 has circular arc-like bright and dark fields at different diameters in such a way that edged sections arise at different diameters. The association and recognition of the code disc can thereby also be improved. Furthermore, it is also provided in accordance with FIG. 8 to arrange different code discs with different diameters behind one another so that these overlap. Thereby the code disc can for example, be imaged very well onto a single image sensor.

The angle of rotation sensor in accordance with the invention thus provides an unambiguous and absolute angle signal in dependence on the code disc rotation. Since this merely takes place by means of a single angular position of an edge 32 the angle of rotation sensor is robust with respect to mechanical tolerances. The sole condition for the correction function is the imaging of a part of the edge at the image sensor. The angular resolution of the angle of rotation sensor is directly and exclusively dependent on the lateral pixel resolution, this means the pixel number, the size and the arrangement of the image sensor as well as the relative length of the edged image.

Figure 9:
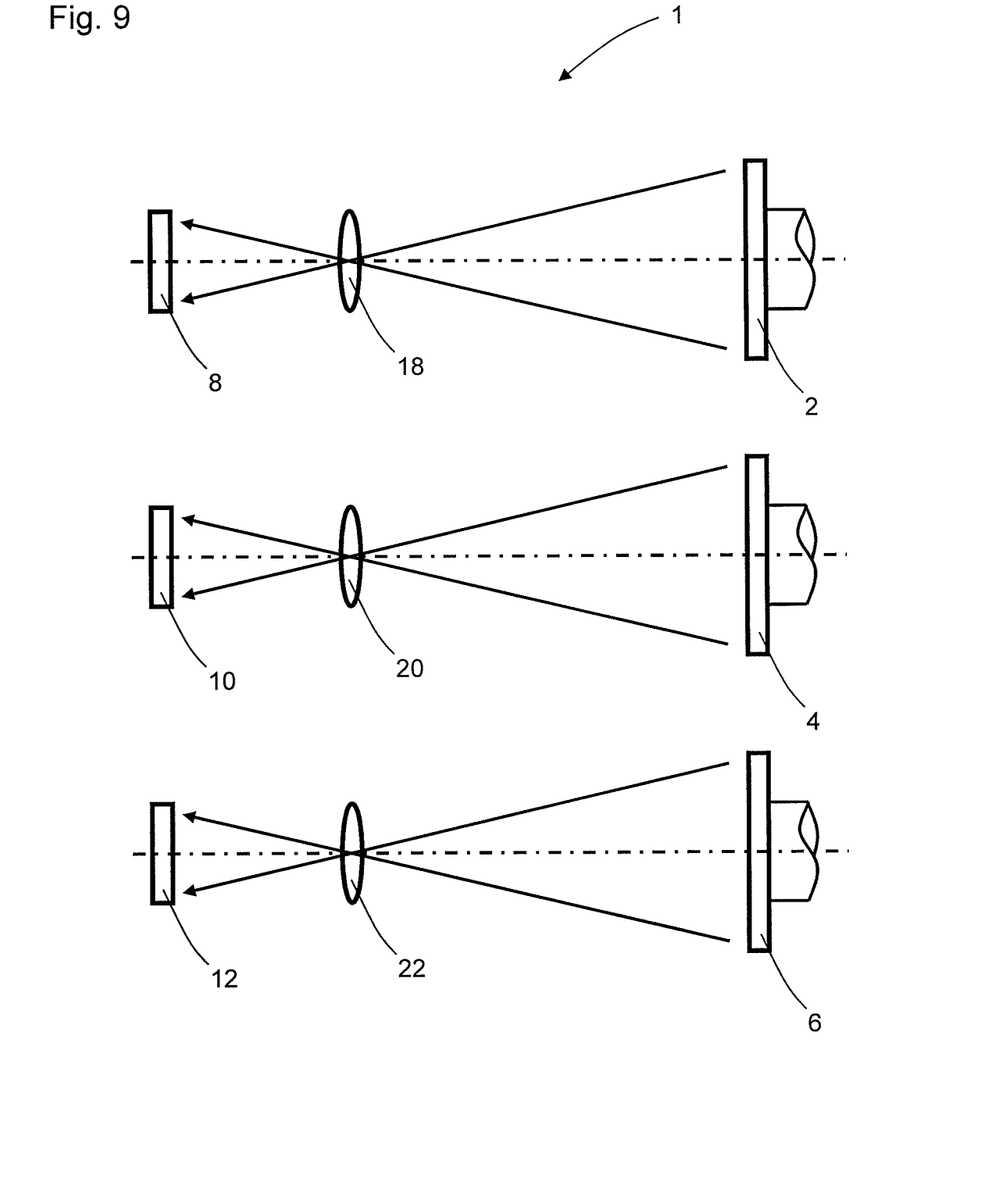
FIG. 9 an angle of rotation sensor having three code discs and a respectively associated optics and a respectively associated image sensor.

FIG. 9 shows an angle of rotation sensor 1 having three code discs 2, 4, 6 and respectively having an associated optics 18, 20, 22 and respectively having an associated image sensor 8, 10, 12. The individual optics 18, 20, 22 can also be combined to one piece as a monolithic component and can be produced as an injection molded optics. The code discs 2, 4, 6 are connected to one another by means of a gear stage and form a multi-turn angle of rotation sensor. The code discs 2, 4, 6 are connected to one another in a cascaded manner with a geared transmission so that a complete rotation for a first code disc 2 only leads to a small change in angle of the second code disc 4 etc. For example, 16 rotations of a first code disc 2 lead to a complete rotation of a second code disc 4 etc. so that 256 rotations can be unambiguously counted with two code discs and 4096 rotations etc. can be unambiguously counted with three code discs. Different transmission ratios are naturally also covered by the invention.

Figure 10:
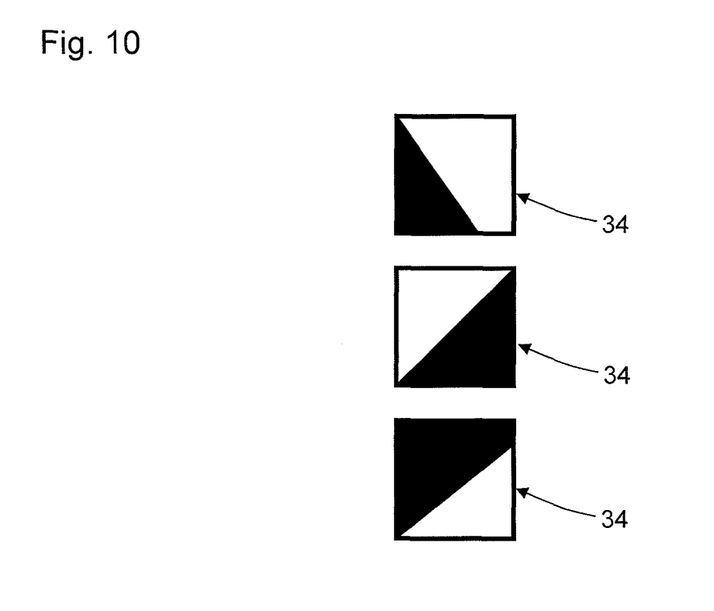
FIG. 10 three discrete images of the image sensor in accordance with FIG. 9.

FIG. 10 shows three discrete images 34 of the image sensors 8, 10, 12 in accordance with FIG. 9. In this connection only a section of the code discs 2, 4, 6 is imaged and illustrated by the image sensors 8, 10, 12 in accordance with FIG. 9. In accordance with the invention it is namely sufficient when merely the edge of the code discs is imaged by the image sensors and is evaluated by an evaluation unit. In this connection the spatial position of the edge is detected by the respective image sensor and is evaluated by an evaluation unit. On the basis of the three recorded images the number of rotations and the exact position of the angle of rotation sensor can be detected simply and fast. The detection also takes place contactless and spatially separate from the code disc by means of the image sensor. For example, a thermal insulation or a galvanic separation between the image sensor and the code disc can thus be realized.

Figure 11:
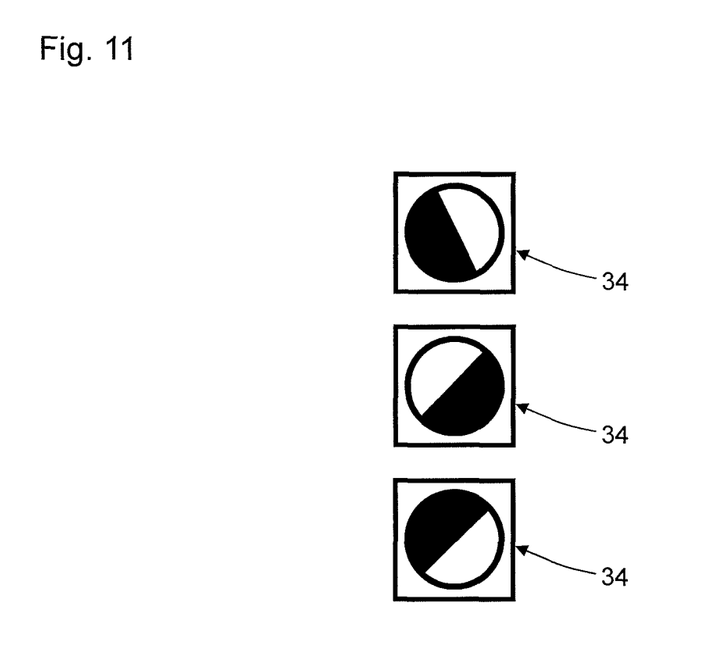
FIG. 11 three discrete images of the image sensors in accordance with FIG. 9.

FIG. 11 shows three discrete images 34 of the image sensors in accordance with FIG. 9, wherein the code disc is completely imaged. As was already explained with reference to FIG. 10 the edges of the code discs are imaged onto the image sensor or at the image sensors and are evaluated in order to detect the exact position and the number of rotations.

Figure 12:
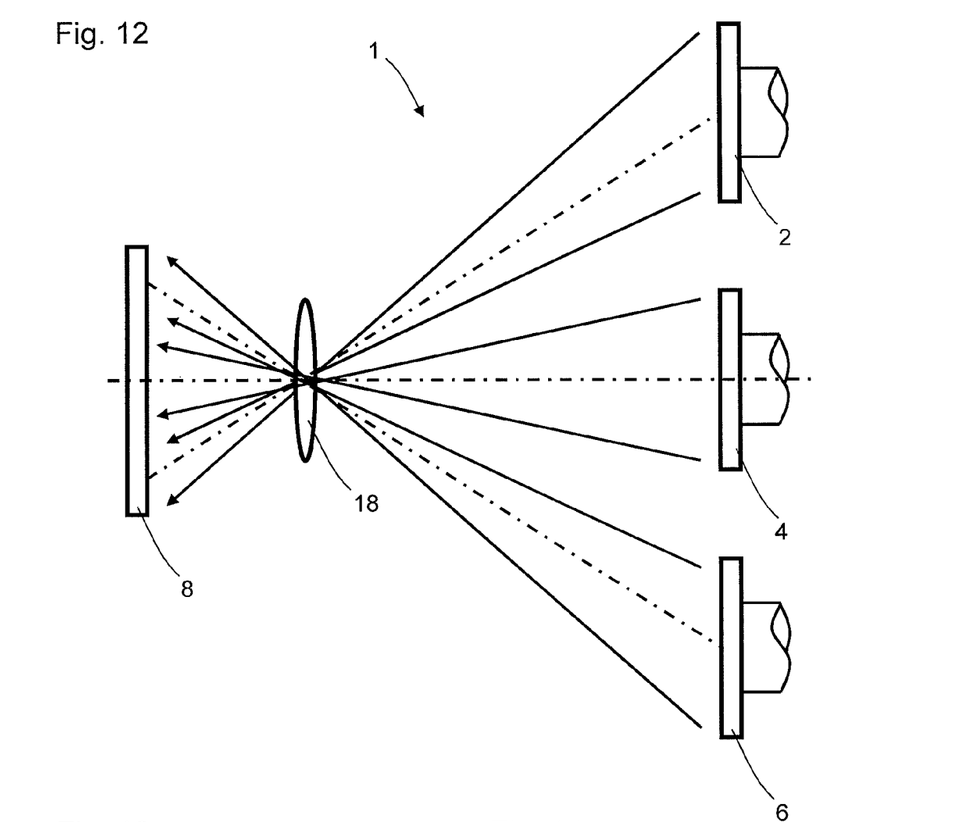
FIG. 12 an angle of rotation sensor having three code discs, a single optics and a single image sensor.

FIG. 12 shows an angle of rotation sensor 1 having three code discs 2, 4, 6, a single optics 18 and a single image sensor 8. Through the use of only a single optics 18 and of only one single image sensor 8 for a plurality of code discs 2, 4, 6 the angle of rotation sensor 1 can be simplified. All three code discs 2, 4, 6 are imaged at the single image sensor 8 and are evaluated by an evaluation unit.

Figure 13:
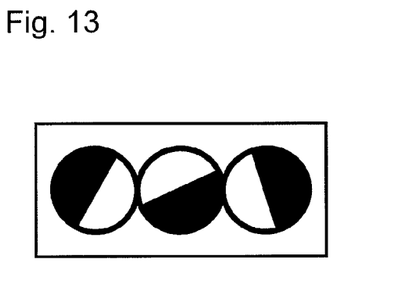
FIG. 13 an imaging of the three code discs in accordance with FIG. 12 with a single image sensor.

FIG. 13 shows an imaging of the three code discs in accordance with FIG. 12 having a single image sensor. In this connection the code discs are completely detected by the image sensor and are also directly arranged next to one another.

Figure 14:
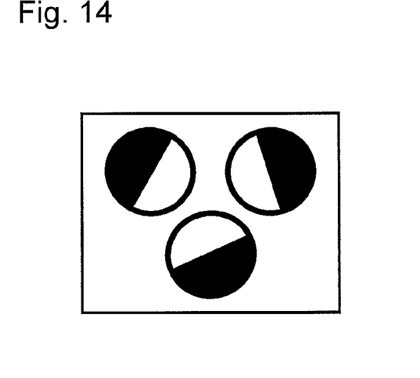
FIG. 14 an imaging of the three code discs in accordance with FIG. 12 with a single image sensor.

FIG. 14 shows an imaging of the three code discs in accordance with FIG. 12 having a single image sensor, wherein the three code discs do not lie directly next to one another, but displaced with respect to one another. In accordance with the FIGS. 13 and 14 the code discs can therefore be arranged arbitrarily and still be imaged in common by one image sensor.

Figure 15:
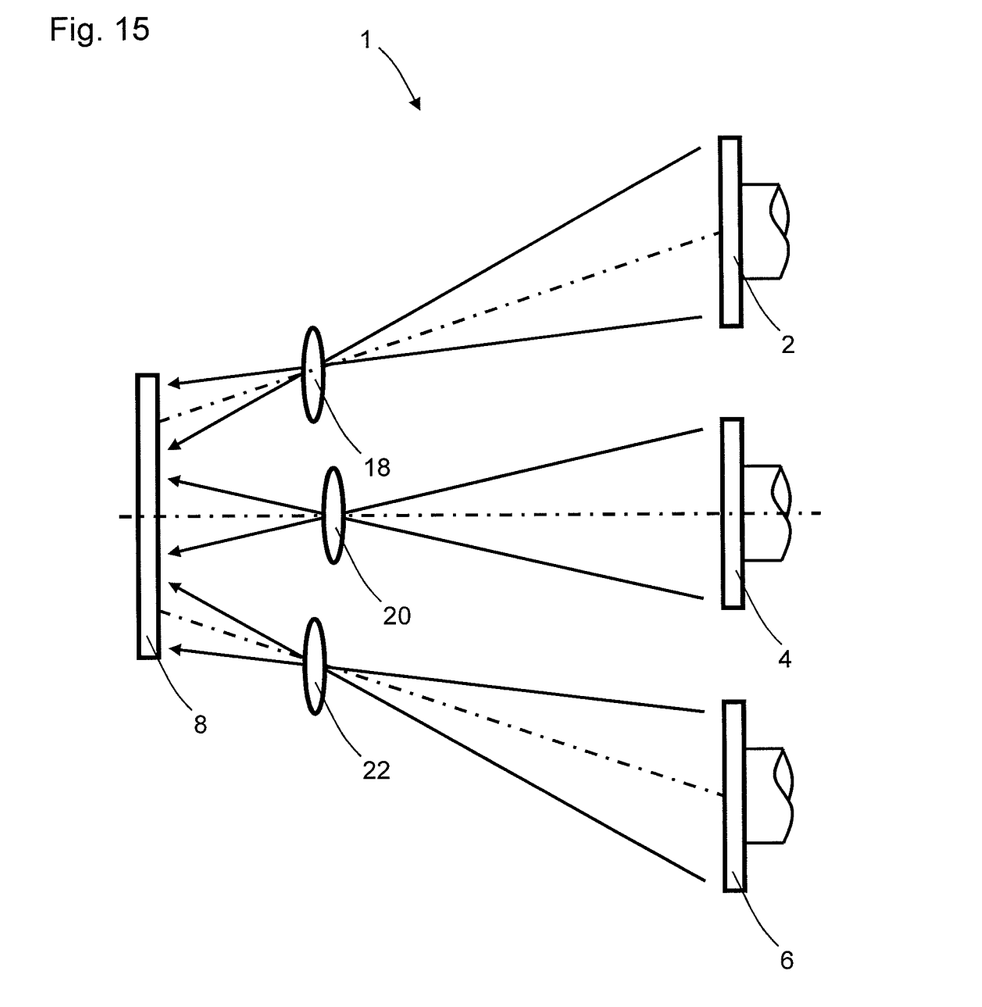
FIG. 15 an angle of rotation sensor having three code discs, respectively three optics and a common single image sensor.

FIG. 15 shows an angle of rotation sensor 1 having three code discs 2, 4, 6, three respective optics 18, 20, 22 and one common single image sensor 8. In contrast to FIG. 12 each code disc 2, 4, 6 is associated with a separate optics 18, 20, 22 in FIG. 15. Thereby each individual code disc 2, 4, 6 can be ideally imaged onto the image sensor 8. The individual optics 18, 20, 22 can in this connection also be formed smaller than for a common optics, whereby the angle of rotation sensor can be of more compact design.

Figure 16:
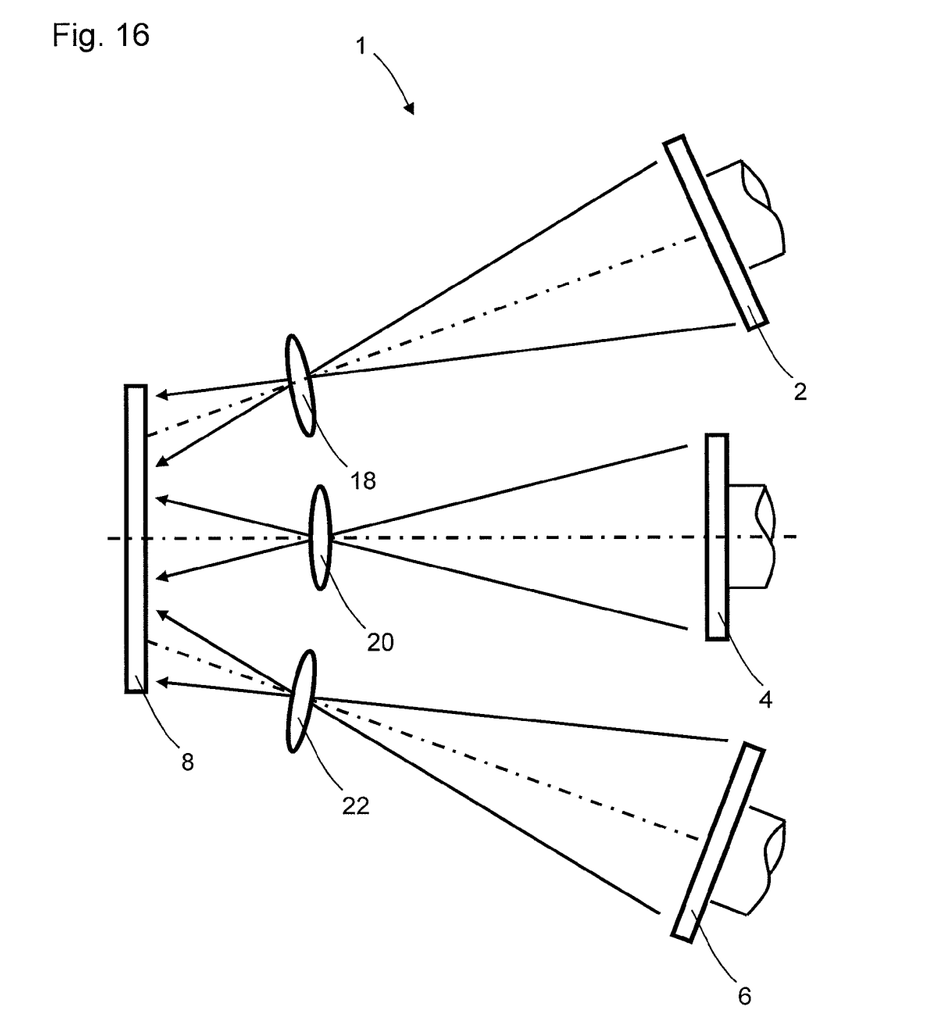
FIG. 16 an angle of rotation sensor having three tilted optics with satisfied Scheimpflug conditions.

FIG. 16 shows an angle of rotation sensor having three tilted optics 18, 20, 22 with satisfied Scheimpflug conditions in accordance with which the code discs 2, 4, 6 are imaged with a maximum exactness. Through the use of separate optics 18, 20, 22 for each code disc 2, 4, 6 also code discs tilted with respect to one another can be ideally imaged onto the image sensor 8.

Figure 17:
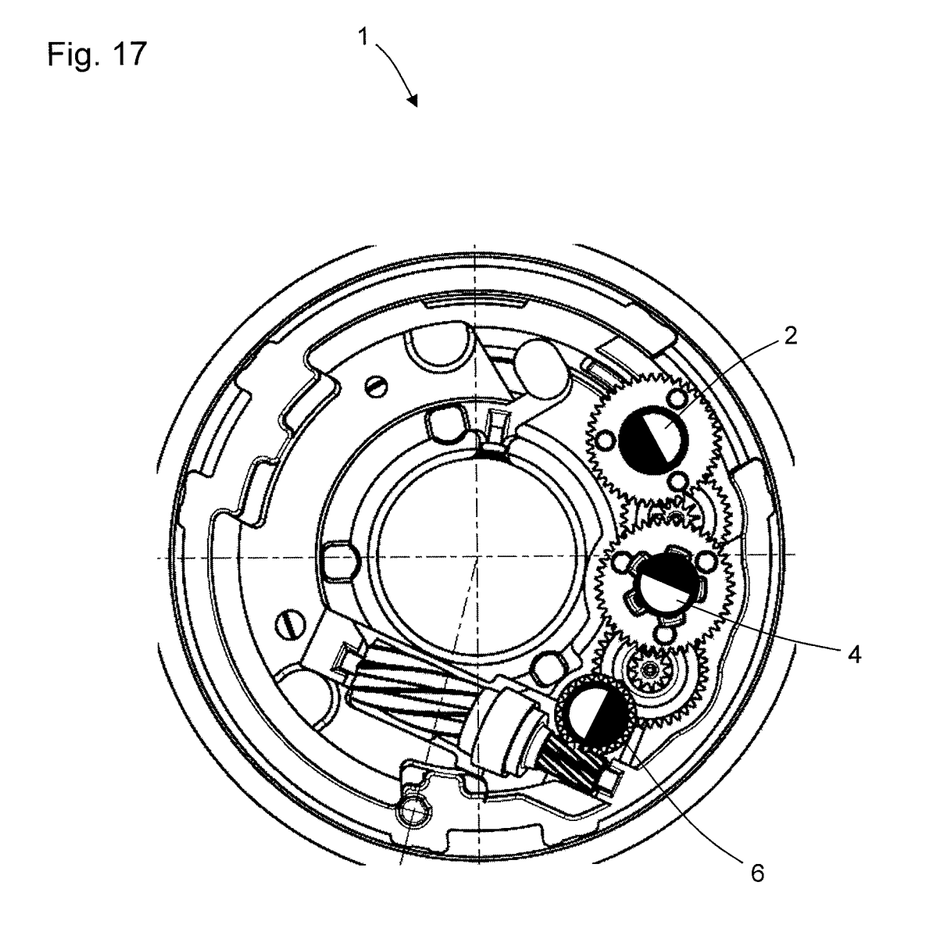
FIG. 17 an angle of rotation sensor having code discs at a multi-turn transmission.

FIG. 17 shows an angle of rotation sensor 1 in accordance with the invention having code discs 2, 4, 6 at a multi-turn transmission. The code discs 2, 4, 6 have a transmission ratio given by a transmission stage in such a way that a plurality of rotations can be registered and an angle of rotation sensor measuring in absolute terms can be formed.

Figure 18:
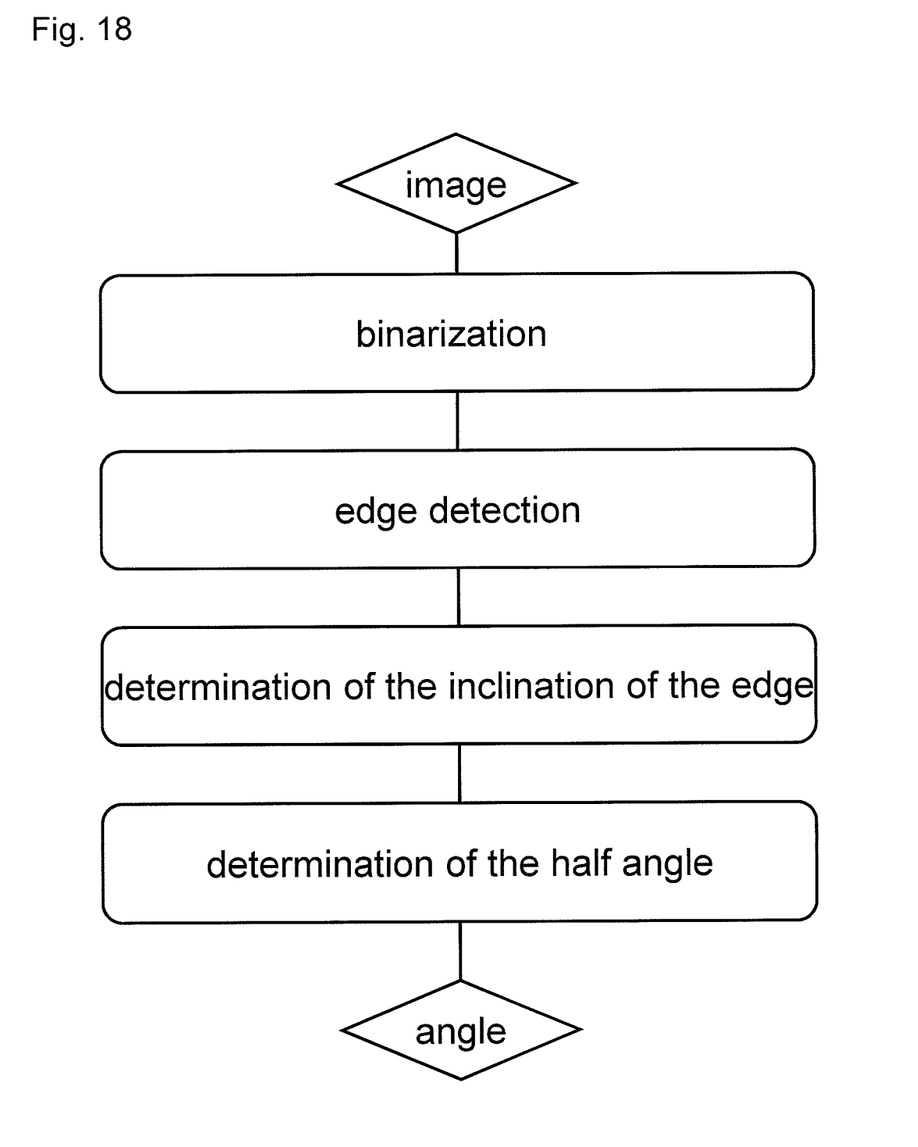
FIG. 18 a schematic flow diagram for image processing.

FIG. 18 shows a schematic flow diagram for image processing. In accordance with the flow diagram, the image of the code disc is detected by the image sensor and is evaluated by an evaluation unit.

In this connection the image is binarized in a first step by the evaluation unit. On the basis of this binary image an edge detection is carried out in a second step. The angular evaluation takes place by means of a classical edge detection e.g. through a Sobel filter, a Canny filter etc. or merely by a direction-dependent differentiation, ideally in both lateral directions of the space of the detector array.

In a third step an edge inclination is determined, whereby the angle of rotation of the edge and thus the angular position of the code disc is determined. Since this information alone still does not deliver an unambiguous angle signal, the absolute angular position of the edges are additionally determined, this means the half angle is determined. This can e.g. take place via a further differentiation of the edge or also via the determination of the brightness value and/or of the difference at both sides of the edge.

LIST OF REFERENCE NUMERALS 1 angle of rotation sensor
2 code disc, first code disc
4 second code disc
6 third code disc
8 image sensor, first image sensor
10 second image sensor
12 third image sensor
14 optical code
16 light source
18 optics, first optics
20 second optics
22 third optics
24 beam forming optics
26 first toothed gear
28 second toothed gear
30 toothed gears
32 edge, edges
34 images

What is claimed is:

1. An angle of rotation sensor comprising a rotatable first code disc (2), at least one first image sensor (8) and at least one optics (18), the at least one optics imaging an optical code (14) of the code disc (2) onto the first image sensor (8), further comprising at least one second rotating code disc (4), the at least one second rotating code disc (4) being either directly or indirectly rotatably connected to the first code disc (2) with a transmission ratio, with an optical code (14) of the second code disc (4) being imaged onto the first image sensor (8) by means of a second optics (20).

2. The angle of rotation sensor in accordance with claim 1, further comprising further code discs (6) which are each rotatably connected to a preceding code disc (2, 4) with a transmission ratio.

3. The angle of rotation sensor in accordance with claim 1, further comprising a light source (16) which is position-fixedly arranged and which illuminates the code discs (2, 4, 6).

4. The angle of rotation sensor in accordance with claim 1, wherein the optics (18, 20, 22) are formed by a single optics (18), whereby the single optics is provided for all code discs (2, 4, 6).

5. The angle of rotation sensor in accordance with claim 1, wherein a separate image sensor (8) is provided for each code disc (2, 4, 6).

6. The angle of rotation sensor in accordance with claim 1, wherein the optics (18, 20, 22) is configured as refractive, diffractive or reflective.

7. The angle of rotation sensor in accordance with claim 1, wherein the light source (16) transmits coherent, incoherent or partly coherent light.

8. The angle of rotation sensor in accordance with claim 1, wherein the light source (16) is configured as narrowband or as broadband with respect to the transmitted wavelength.

9. The angle of rotation sensor in accordance with claim 1, wherein a beam forming optics is arranged downstream of the light source (16), the beam forming optics being configured as refractive, diffractive or reflective.

* * * * *